(12) United States Patent
Suarez et al.

(10) Patent No.: US 7,784,163 B2
(45) Date of Patent: Aug. 31, 2010

(54) RIVETED FASTENER EXTRACTION APPARATUSES AND METHOD

(75) Inventors: John F. Suarez, Mission Viejo, CA (US); Bradley G. Weiskittel, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 538 days.

(21) Appl. No.: 10/907,129

(22) Filed: Mar. 22, 2005

(65) Prior Publication Data

US 2006/0213047 A1  Sep. 28, 2006

(51) Int. Cl.
*B23P 19/04* (2006.01)
*B23B 51/00* (2006.01)
*B23P 19/02* (2006.01)

(52) U.S. Cl. .............................. 29/282; 29/235; 29/240; 29/426.4; 29/426.1; 29/426.5; 83/675; 83/673; 408/72 R; 408/187; 81/9.44

(58) Field of Classification Search ................ 29/426.4, 29/426.1, 426.5, 240, 402.03, 566.1, 558, 29/557, 898.08, 282, 235; 83/675, 673; 408/54, 72 R, 82, 115 R, 187; 81/9.44, 3.35, 81/488, DIG. 9
See application file for complete search history.

(56) References Cited

U.S. PATENT DOCUMENTS

| | | | | |
|---|---|---|---|---|
| 982,893 | A * | 1/1911 | Stephens | 81/3.35 |
| 1,502,652 | A * | 7/1924 | Babcock | 408/82 |
| 1,540,826 | A * | 6/1925 | Watts | 82/1.3 |
| 1,742,040 | A * | 12/1929 | Lynch et al. | 173/93.7 |
| 2,620,689 | A * | 12/1952 | Cogsdill | 82/1.5 |
| 2,752,671 | A * | 7/1956 | Alyea | 29/426.4 |
| 2,803,981 | A * | 8/1957 | Stoeker | 81/176.15 |
| 2,853,723 | A * | 9/1958 | Winslow | 7/158 |
| 2,945,426 | A * | 7/1960 | Buchan | 408/187 |
| 2,959,109 | A * | 11/1960 | Buchan | 408/187 |
| 3,170,224 | A * | 2/1965 | Johnson | 408/188 |
| 3,540,325 | A * | 11/1970 | Artaud | 408/187 |
| 3,620,635 | A * | 11/1971 | DalBianco et al. | 408/84 |
| 3,827,821 | A * | 8/1974 | Swenson | 408/59 |
| 4,085,337 | A * | 4/1978 | Moeller | 307/115 |
| 4,303,356 | A | 12/1981 | Williams et al. | |
| 4,432,677 | A * | 2/1984 | Lewis | 408/203.5 |

(Continued)

FOREIGN PATENT DOCUMENTS

DE   200 10 941 U1   9/2000

(Continued)

*Primary Examiner*—Essama Omgba
(74) *Attorney, Agent, or Firm*—Ostrager Chong Flaherty & Broitman P.C.

(57) ABSTRACT

An extraction apparatus (40) for the removal of a riveted fastener (12) from a structure (10) includes a shaft (42) and a cutting element (62). The cutting element (62) is mechanically coupled to the shaft (42) and is configured to cut a portion of the riveted fastener (12). The shaft (42) and the cutting element (62) are configured for insertion through an inner channel (24) of the riveted fastener (12). A method of replacing the riveted fastener (12) from the structure (10) includes inserting the extraction apparatus (40) through the inner channel (24). The extraction apparatus (40) is rotated. A portion of the riveted fastener (12) that extends through the structure (10) is removed. A head (20) of the riveted fastener (12) is also removed from the structure (10).

8 Claims, 7 Drawing Sheets

U.S. PATENT DOCUMENTS

| | | | | |
|---|---|---|---|---|
| 4,475,852 A * | 10/1984 | Koppelmann | ............... | 408/73 |
| 4,646,413 A * | 3/1987 | Nall et al. | ............... | 29/402.03 |
| 5,318,390 A * | 6/1994 | DalBianco | ............... | 408/84 |
| 5,685,209 A * | 11/1997 | Fiedler | ............... | 81/436 |
| D396,616 S * | 8/1998 | McCallum | ............... | D8/22 |
| 5,829,925 A * | 11/1998 | Nordstrom | ............... | 408/57 |
| 6,035,506 A | 3/2000 | Bowen | | |
| 6,240,614 B1 * | 6/2001 | Kojima et al. | ............... | 29/426.4 |
| 6,511,267 B2 * | 1/2003 | Slaughter | ............... | 408/1 R |
| 6,568,062 B1 * | 5/2003 | Opper et al. | ............... | 29/426.5 |
| 6,654,997 B2 * | 12/2003 | Donovan et al. | ............... | 29/426.4 |
| 7,039,993 B1 * | 5/2006 | Smith et al. | ............... | 29/235 |
| 7,093,360 B1 * | 8/2006 | Craig | ............... | 29/890.031 |
| 7,131,175 B2 * | 11/2006 | Young | ............... | 29/426.5 |
| RE39,582 E * | 4/2007 | Luhm | ............... | 29/525.11 |
| 2006/0021207 A1 * | 2/2006 | Haines, jr. | ............... | 29/426.4 |

FOREIGN PATENT DOCUMENTS

| | | |
|---|---|---|
| EP | 1072338 A1 * | 1/2001 |
| GB | A-1 603 105 | 11/1981 |
| JP | 2000 218417 A | 8/2000 |

* cited by examiner

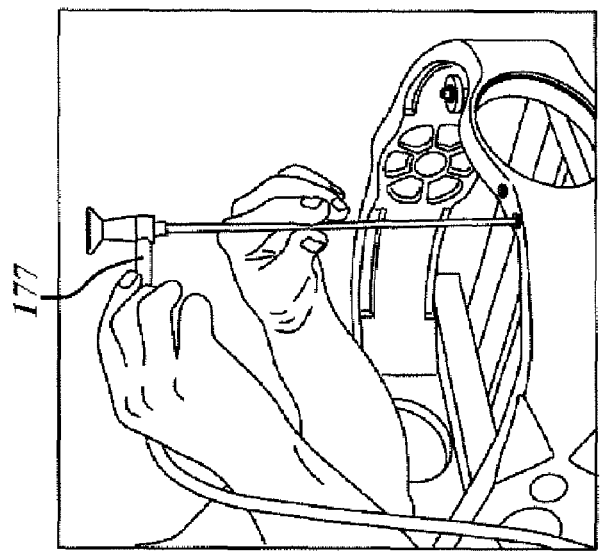
FIG. 13
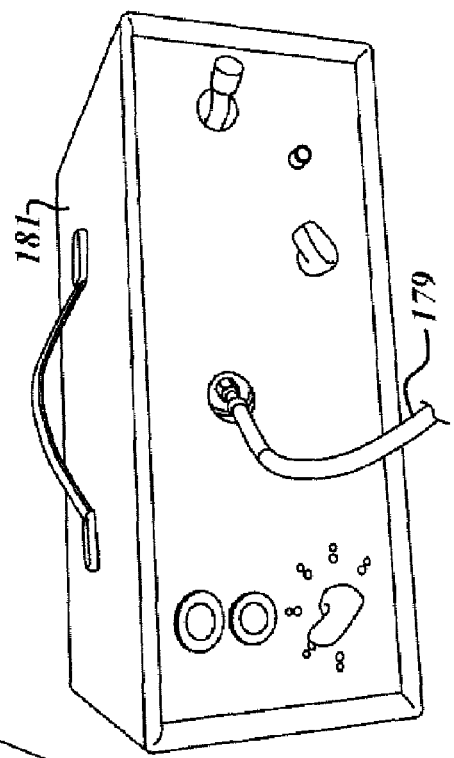
FIG. 14
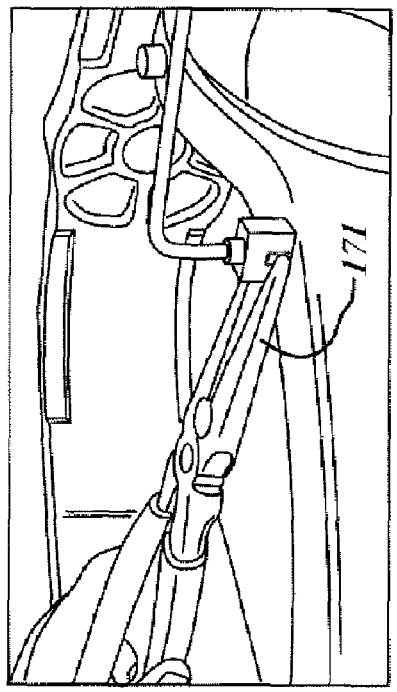
FIG. 15
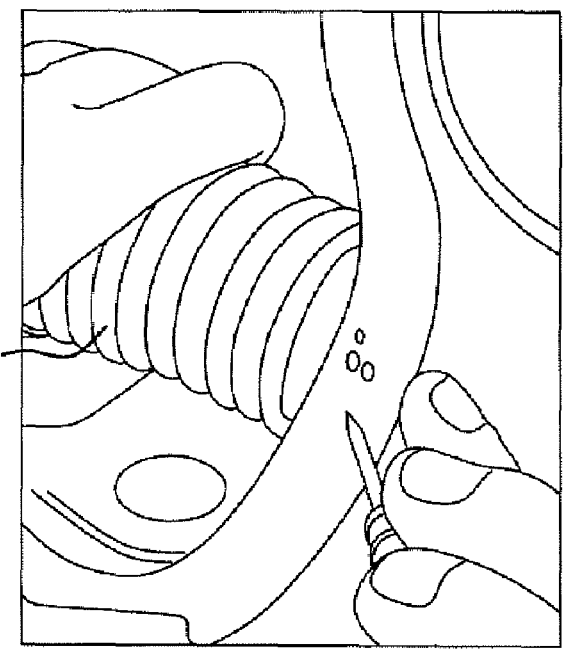

RIVETED FASTENER EXTRACTION APPARATUSES AND METHOD

GOVERNMENT CONTRACT

The invention described herein was made in the performance of work with Government support under Contract No. HP10926M8S. The Government has certain rights in this invention.

TECHNICAL FIELD

The present invention is related generally to riveted fasteners. More particularly, the present invention is related to a method of extracting a riveted fastener and to apparatuses used to perform such extraction.

BACKGROUND OF THE INVENTION

There are many situations where it is required to provide a structure or the like with captive nuts such that a system can be assembled in place and/or such that components may be fastened to the structure. To satisfy this need blind rivet nuts, commonly referred to as "rivnuts", are often used and installed into a structure. This is especially true in situations where access to only one side of the structure is accessible. The inaccessible side may be referred to as or associated with a blind cavity.

A structure is typically preformed or drilled to have designated holes for the insertion of the rivnuts. The rivnuts are subsequently compressed using a mandrel or other rivnut installation tool such that they are crimped intimately around the periphery of designated holes, thus preventing withdrawal therefrom. In general, rivnuts have an inner threaded channel for the coupling of a threaded fastener, such as a bolt or screw, therein and thus the attachment of components thereon.

Rivnuts are often used, for example, on gyro structures including stabilized platform gimbal assemblies, which have blind inner cavities. The stated rivnuts are utilized for the attachment of wire harnesses to the gimbal assemblies. During certain maintenance, repair, modification, or update tasks of the gyro structures the wire harnesses are removed from the gimbal assemblies.

The wire harnesses are attached via cable clamps to the gimbals. The clamps are attached using screws. A locking compound, such as LOCKTITE®, is often applied to the screws prior to being threaded into the rivnuts to prevent loosening or dislodging of the screws. After an extended period of time and due to the use of the locking compound, when the screws are removed the threads within the rivnuts can be stripped or damaged. In certain instances, the removal of the screws causes the rivnuts to loosen relative to the structure and spin in the associated structure holes.

Spare gimbals for the replacement of the gimbals, that have one or more damaged rivnuts, are often scarce or nonexistant. Thus, the entire gyro associated stabilized platforms are unuseable and non-serviceable. Replacement of gimbals with newly manufactured gimbals is generally considered an undesirable option due to the high costs, part complexity of a gyro stabilized platform, and many times the lack of original manufacturing tooling associated with the gimbals.

It is also undesirable to drill out a rivnut. When drilling out a rivnut the lower inner portion of the rivnut breaks off and then resides within and cannot be removed from the blind cavity. The broken off portion is considered foreign object debris and can rattle within the cavity and cause noise or improper operation of gyro components.

Thus, there exists a need for an improved removal technique that allows for the extraction of a rivnut including the portion thereof that resides within a blind cavity.

SUMMARY OF THE INVENTION

One embodiment of the present invention provides an extraction apparatus for the removal of a riveted fastener from a structure. The apparatus includes a shaft and a cutting element. The cutting element is mechanically coupled to the shaft and is configured to cut a portion of the riveted fastener. The shaft and the cutting element are configured for insertion through an inner channel of the riveted fastener.

Another embodiment of the present invention provides a method of replacing a riveted fastener from a structure. The method includes inserting an extraction apparatus, having a cutting element, through an inner channel of the riveted fastener. The extraction apparatus is rotated. A portion of the riveted fastener that extends through the structure is removed. A head of the riveted fastener is also removed from the structure.

The embodiments of the present invention provide several advantages. One such advantage is the provision of extraction apparatuses for the removal of riveted fasteners. The apparatuses allow for the removal of riveted fasteners without portions of the riveted fasteners remaining within associated blind cavities.

Another advantage provided by an embodiment of the present invention, is the provision of a method of removing essentially the entire riveted fastener from a structure having a blind cavity. This allows for the replacement of rivnuts and the reuse and nonreplacement of gyro stabilized platform gimbals.

Still another advantage provided by an embodiment of the present invention, is the nondestructive provision of removing a riveted fastener without cutting into or damaging the mounting structure of that fastener. This can improve safety associated with the removal of, for example, rivnuts from a beryllium gyro gimbal.

Furthermore, the above-stated advantages reduce operating costs through reuse of gyro gimbals and eliminate the desire and/or requirement associated with the replacement of gimbals due to one or more damaged rivnuts.

Other features, benefits and advantages of the present invention will become apparent from the following description of the invention, when viewed in accordance with the attached drawings and appended claims.

BRIEF DESCRIPTION OF THE DRAWINGS

FIG. 13 is a perspective view of the riveted fastener head extraction apparatus illustrating removal of the riveted fastener in accordance with an embodiment of the present invention FIG. 14 is a perspective view illustrating extraction of debris from a blind cavity in accordance with an embodiment of the present invention.

FIG. 15 is a perspective view of a fiber optic system for inspecting the blind cavity subsequent to removal of the riveted fastener in accordance with an embodiment of the present invention.

DETAILED DESCRIPTION

Figure 1:
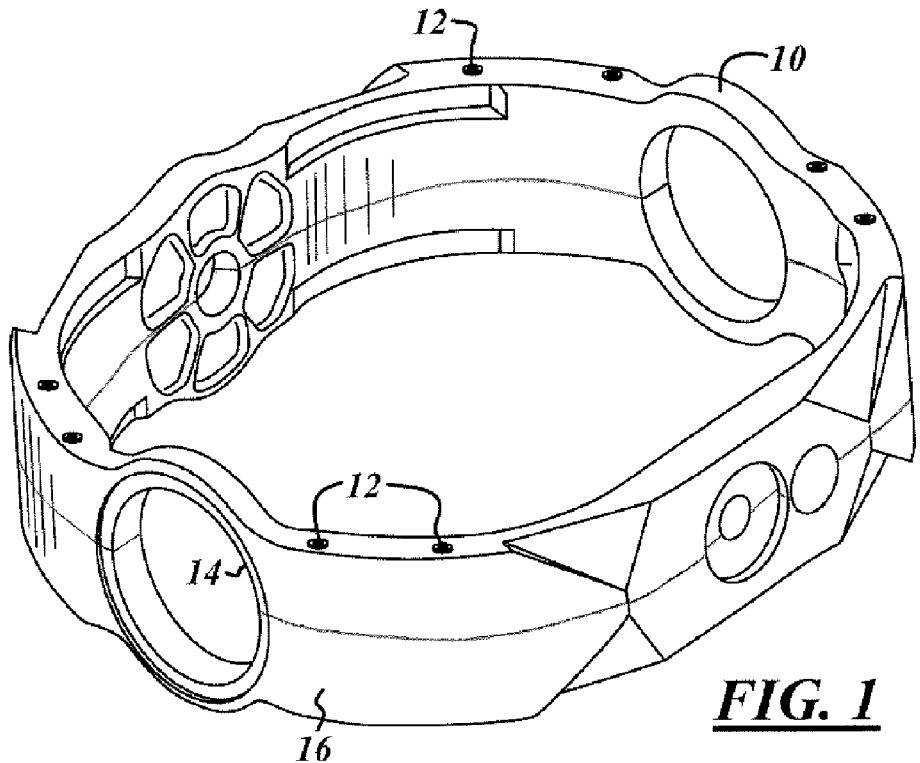
FIG. 1 is a perspective view of a gyro stabilized platform gimbal having riveted fasteners.

In the following Figures the same reference numerals will be used to refer to the same components. While the present invention is described primarily with respect to a method of extracting a riveted fastener and to apparatuses used to perform such extraction, the present invention may be adapted and applied in various fastener removal and replacement applications. The present invention may be applied in aeronautical applications, nautical applications, railway applications, automotive vehicle applications, and commercial and residential applications. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one or more constructed embodiments. These specific parameters and components are included as examples and are not meant to be limiting.

Also, although the present invention is primarily described with respect to the removal and replacement of rivnuts, the present invention may be applied to other riveted fasteners known in the art. For example, the present invention may be applied to captive nuts or nut plates.

Referring now to FIG. 1, a perspective view of a gyro stabilized platform gimbal 10 having riveted fasteners 12 is shown. The riveted fasteners 12 are shown as rivet nuts or rivnuts and are utilized to attach wire harness cable clamps and thread screws (both of which not shown) thereon. The gyro gimbal 10 has a first half 14 and a second half 16 that are mated together. The halves 14 and 16 may be cemented to each other to form a single solid element. Upon cementing of the halves 14 and 16 the riveted fasteners 12 are only accessible from the exterior of the gyro gimbal 10.

Figure 2B:
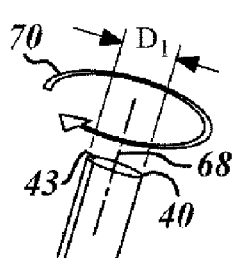
FIG. 2B is a cross-sectional side view of the rivnut of FIG. 2A.
Figure 2A:
FIG. 2A is a top view of a rivnut prior to installation.
Figure 2C:
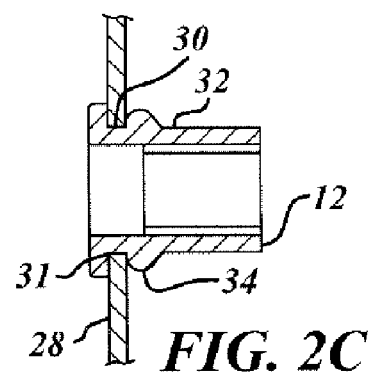
FIG. 2C is a cross-sectional side view of the rivnut of FIG. 2A subsequent to installation.

Referring now to FIGS. 2A-C, a top view and a cross-sectional side view of one of the rivnuts 12 prior to installation and a cross-sectional side view of one of the rivnuts 12 subsequent to installation are shown. The rivnut 12 has a head 20 and a tubular section 22 with an inner channel 24. The inner channel 24 may be threaded. The rivnut may also include a key 26. The tubular section 22 is inserted and extended through the structure 28. Upon insertion, the tubular section 22 includes a structure laterally adjacent portion 30, which extends through the hole 31 of the structure 28, and a prior-protruding portion (not shown). The prior-protruding portion refers to the protruding portion of the rivnut 12 prior to compression thereof. Upon installation of the rivnut 12, the tubular section 22 includes the adjacent portion 30 and the post-protruding portion 32, which includes a compressed area 34. When installed, part of the prior-protruding portion of the tubular section 22 is compressed, which locks the rivnut 12 to the structure 28 and forms the compressed area 34. The rivnut 12 may be installed using any conventional method of installation.

Figure 3:
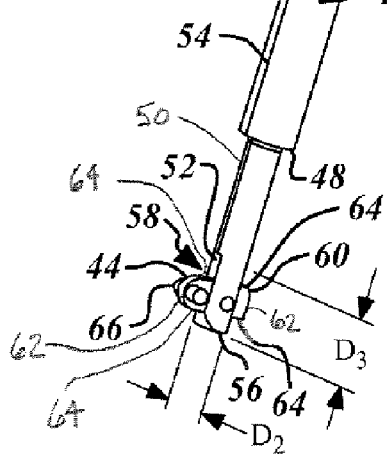
FIG. 3 is a perspective view of an extraction cutting apparatus in accordance with an embodiment of the present invention.

Referring now to FIG. 3, a perspective view of a riveted fastener extraction cutting apparatus 40 in accordance with an embodiment of the present invention is shown. The cutting apparatus 40 includes a shaft 42, with a top surface 43, and a pivot plate 44. The shaft 42 includes a first tubular section 46, a shoulder 48, and a second tubular section 50. The first section 46 has a first outer diameter $D_1$ and the second section 50 has a second outer diameter $D_2$ that is smaller than the first diameter $D_1$. Although the shaft 42 is shown as having multiple tubular section with multiple outer diameters, it may have a single tubular section with a single outer diameter. The first section 46 is configured for insertion into a high-speed rotating device, such as a chuck of a drill or other rotating device, for rotation of the cutting apparatus 40. The second section 50 is configured for insertion within an inner channel of a riveted fastener, such as the inner channel 24. The second section 50 includes a slot 52 that extends along a center plane, designated by line 54, of the shaft 42 from an insertion end 56 inward a first predetermined distance $D_3$. The pivot plate 44 is coupled to the second section 50. A center portion 58 of the pivot plate 44 resides within the slot 52 and is coupled to the shaft 42 via a pivot pin 60. The pivot plate 44 is free to rotate about the pivot pin 60.

The pivot plate 44 includes one or more cutting elements 62, each with a pair of cutting edges 64, and a pendulous weight 66. During insertion and removal of the second section 50 in and out of a riveted fastener, the pivot plate 44 is in-line or parallel with the shaft 42 and the cutting element 62, opposite the pendulous weight 66, is within the slot 52. When the second section 50 is not rotating the gravitational forces exerted on the pivot plate 44, due to the pendulous weight 66, cause the pivot plate 44 to rotate to the parallel orientation. During use and rotation of the cutting apparatus 40 the pivot plate 44 rotates such that the cutting elements 62 and the pendulous weight 66 pivot outwardly and are perpendicular to a centerline and center axis of rotation 68 of the shaft 42. Rotation of the cutting apparatus 40 is shown by arrow 70. The cutting elements 62 may be integrally formed as part of the pivot plate 44 or separate therefrom. The ends and/or edges of the pivot plate 44 may be sharpened to form the cutting elements 62.

In operation, the second section 50 is inserted in and protrudes through a riveted fastener such that the pivot plate 44 is free to rotate externally from the fastener. When the second section 50 is rotated the cutting elements 62 are pivoted outward due to the centrifugal forces exerted thereon. As such, the cutting edges 64 are perpendicular to the center axis 68 to allow for the cutting of the riveted fastener.

The shaft 42 may be formed of a nonmagnetic material such that during rotation of the shaft 42 and cutting of a riveted fastener the shaft 42 does not become magnetized. A magnetized shaft can attract and prevent free rotation of the pivot plate 44. The shaft 42 may be formed of, for example, stainless steel, titanium, plastic, or other nonmagnetic material.

The cutting elements 62 may be used to machine or cut, which includes grinding, portions of riveted fasteners. The cutting elements 62 may be formed of high-speed steel, carbide, or other cutting material known in the art. The pivot plate 44 may be formed of the same or different material as that of the cutting elements 62. High-speed steel generally refers to a combination of one or more materials selected from tungsten, molybdenum, vanadium, and cobalt. Carbide may include tungsten carbide, silicon carbide, ceramics, or the like. Also, although the pivot plate 44 is shown as having a single cutting element, any number of cutting elements may be used.

Figure 4:
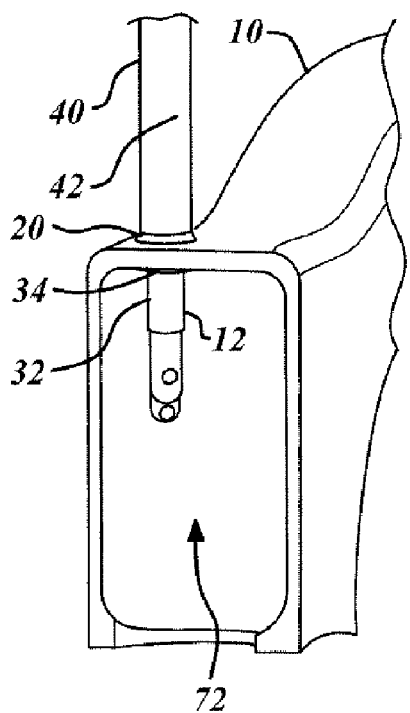
FIG. 4 is a cross-sectional perspective view of the extraction cutting apparatus of FIG. 3 inserted through a rivnut and into a blind cavity of a gyro gimbal in accordance with an embodiment of the present invention.

Referring now to FIG. 4, a cross-sectional perspective view of the extraction cutting apparatus 40 inserted through one of the rivnuts 12 and into a blind cavity 72 of the gyro gimbal 10 in accordance with an embodiment of the present invention is shown. Prior to rotation of the shaft 42 the second section 50 is inserted into and through the rivnut 12. The second section 50 may be inserted up to the shoulder 48 abuts the head 20, as shown, or to a lesser extent as desired. The second section 50 is inserted through the rivnut 12 at least until the pivot plate 44 is able to rotate freely. After full protrusion of the pivot plate 44 the shaft 42 may be rotated and lifted to cut away the protruding portion 32 including at least partially the compressed area 34.

Figure 5:
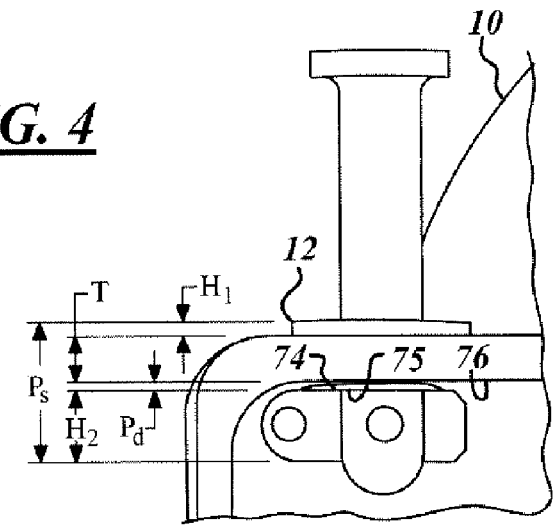
FIG. 5 is a close-up cross sectional perspective view of the extraction cutting apparatus subsequent to the cutting of the rivnut in accordance with an embodiment of the present invention.

Referring now to FIG. 5, a close-up cross sectional perspective view of the cutting apparatus 40 subsequent to the cutting of the rivnut 12 in accordance with an embodiment of the present invention is shown. Notice that a thin protruding remainder 74, having a cut surface 75, is left after cutting away a majority of the protruding portion 32. In certain applications, such as when removing a rivnut from a gyro gimbal, the cutting apparatus 40 is halted prior to coming in contact with an inner surface 76 of the gimbal 10. This prevents damage to the gimbal 10 and prevents cutting into a material, such as beryllium. This process is described in further detail below.

Figure 6:
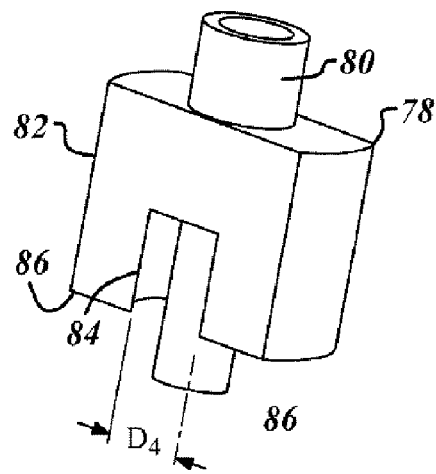
FIG. 6 is a perspective view of a riveted fastener head extraction apparatus in accordance with an embodiment of the present invention.

Referring now to FIG. 6, a perspective view of a riveted fastener head extraction apparatus 78 in accordance with an embodiment of the present invention is shown. The head extraction apparatus 78 is used to remove a riveted fastener from a structure, such as from the gimbal 10 or the structure 28, after cutting a protruding portion of the riveted fastener, such as the protruding portion 32. The head extraction apparatus 78 includes a fastener 80 and a support element 82. The fastener 80 is configured for insertion into at least the head of a riveted fastener. The support member 82 is coupled to the fastener 80 and is configured for positioning over a riveted fastener head. The support member 82 has an open sided and ended tubular slot 84 with an inner diameter $D_4$ that is larger than the outer diameter of a riveted fastener head. During use of the head extraction apparatus 78, legs 86 of the support member 82 are positioned proximate and on opposite sides of a riveted fastener head and the protruding remainder portion. The fastener 80 is threaded and is turned into the riveted fastener head. Rotation of the fastener 80 within the support element 82 and into the riveted fastener head causes the head to be pulled out of the corresponding structure. This is described in step 170 below.

Figure 7:
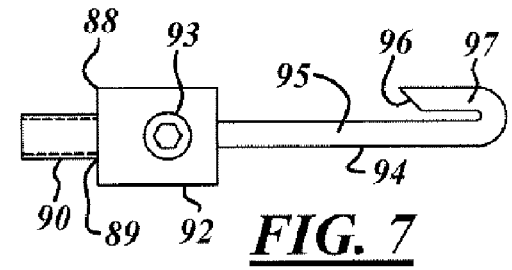
FIG. 7 is a side view of a blind riveted fastener depth indicator in accordance with an embodiment of the present invention.

Referring now to FIG. 7, a side view of a blind riveted fastener depth indicator 88 in accordance with an embodiment of the present invention is shown. The depth indicator 88 includes an adaptor 89, with a handle 90 and a body 92, and a depth hook 94. The handle 90 is configured for insertion into a measuring device, for example, into a chuck of a milling machine having a travel indicator. The handle 90 may be threaded. The body 92 is attached to the handle 90 and includes a setscrew 93 for insertion and removal of the depth hook 94. The handle 90, the body 92, and the depth hook 94 are sized and configured for insertion within a riveted fastener. The handle 90, the body 92, and the depth hook 94 may be formed of similar materials and may be formed as a single integral unit or as separate components, as shown. The handle 90, the body 92, and the depth hook 94 may be generally cylindrical in shape, as shown, or may be of other shapes and of various sizes.

The depth hook 94 has a shaft 95, a tapered tip 96, and a return end 97. The tapered tip 96 and the return end 97 are used to determine the protruding depth of a cut riveted fastener. This is explained in further detail below with respect to the cut verification phase in steps 152-168.

Figure 8:
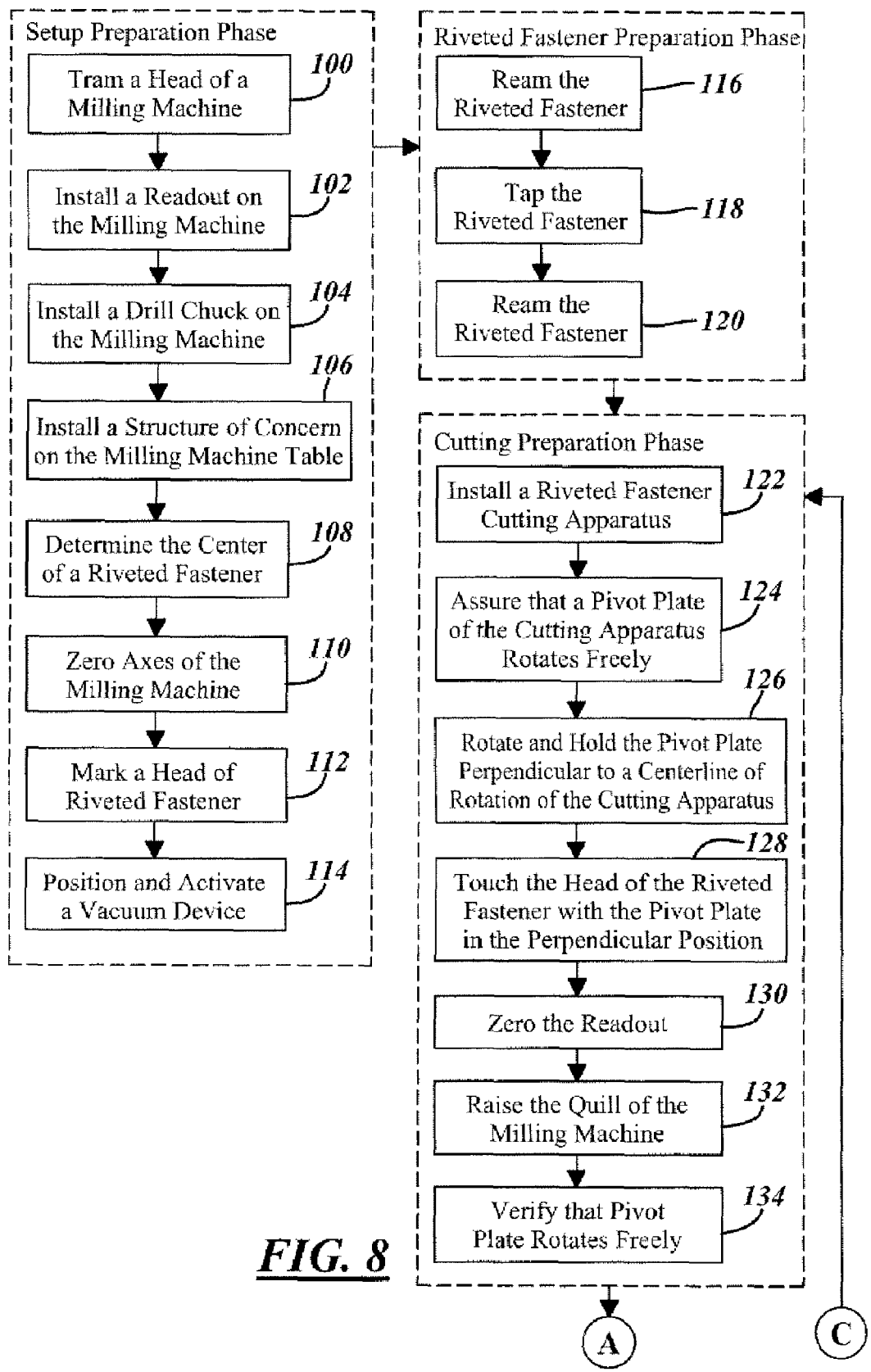
FIG. 8 is a logic flow diagram illustrating a method of replacing a riveted fastener in accordance with an embodiment of the present invention.
Figure 8A:
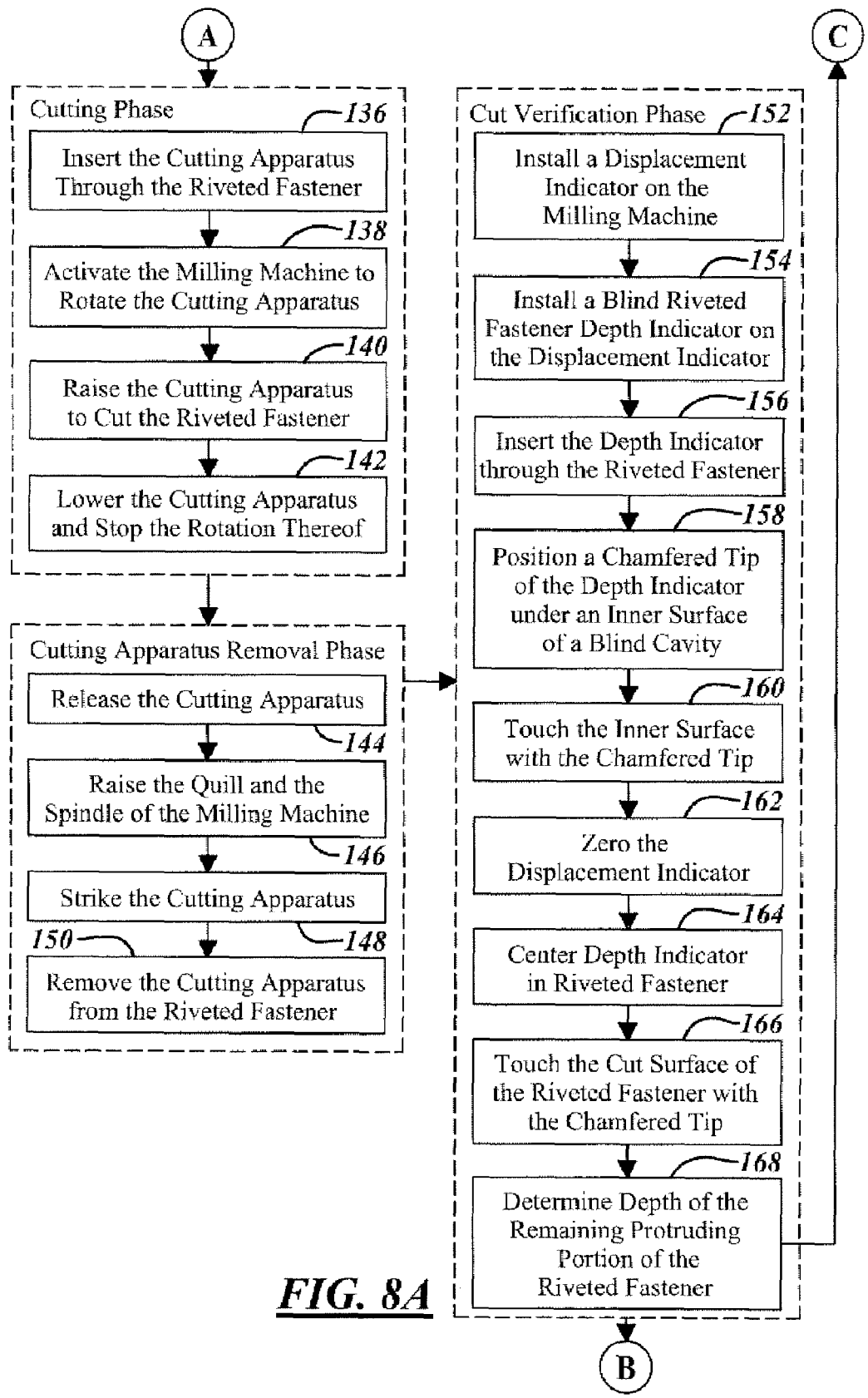
Figure 8B:
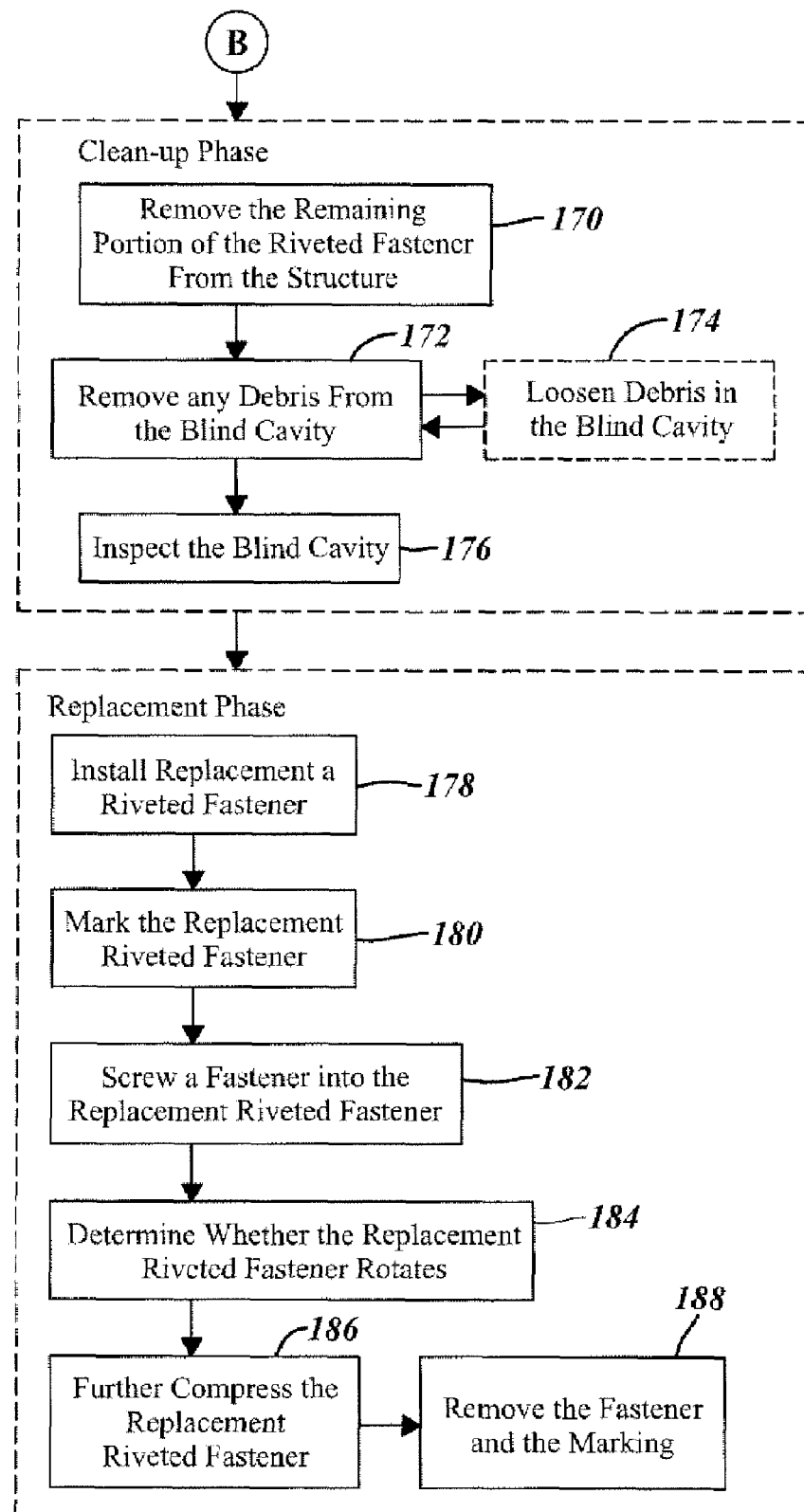

Referring now to FIG. 8, a logic flow diagram illustrating a method of replacing a riveted fastener in accordance with an embodiment of the present invention is shown. Although the following steps are described with respect to the replacement of a gyro gimbal rivnut and to the use of a vertical milling machine for the removal of the rivnut, the steps are for example purposes only and may be easily modified for other riveted fasteners and removal equipment.

Figure 9:
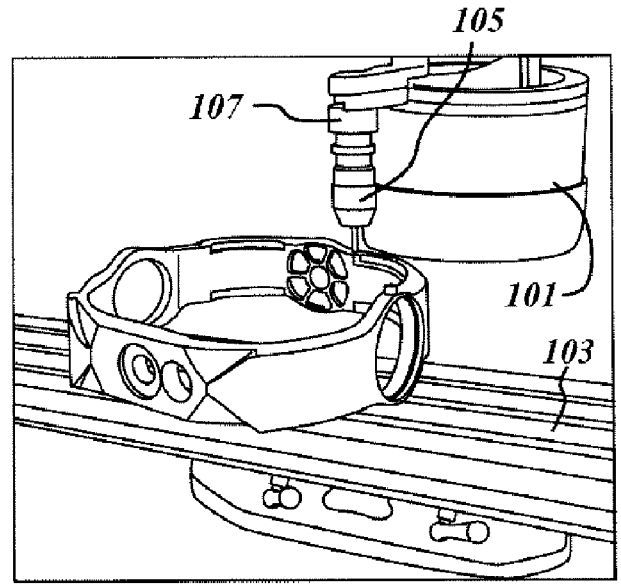
FIG. 9 is a perspective view of a gyro gimbal mounted on a milling machine.

The following steps 100-114 may be referred to as the setup preparation phase. In step 100, the head of a vertical milling machine is properly tramed such that the head and spindle are normal to the milling machine table using techniques known in the art. In step 102, a readout, which may be digital or in the form of a dial indicator, is installed on the milling machine to provide an accurate measurement of the vertical displacement of the spindle. A vertical milling machine 101 having a table 103 is shown in FIG. 9.

Figure 11:
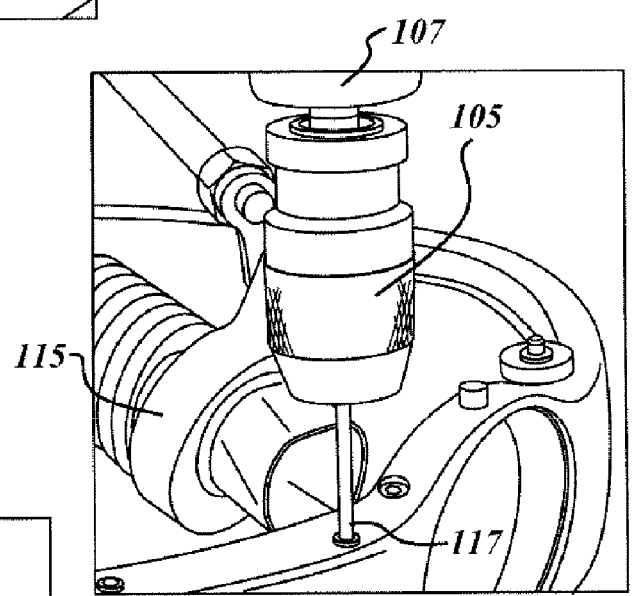
FIG. 11 is a perspective view of a reamer mounted within a chuck of the milling machine and used in accordance with an embodiment of the present invention.

In step 104, a drill chuck may be installed into the spindle of the milling machine. A drill chuck 105 and a spindle 107 are shown in FIGS. 9 and 11. In the following steps, one or more indicators, reamers, taps, and riveted fastener extraction cutting apparatuses are described with respect to the direct mounting or installing thereof in a drill chuck, these devices may be configured for sleeve and collet installation or for direct installation into a spindle. The state devices may be configured for insertion into a sleeve or a collet prior to installation into a spindle. Also, the stated devices may be configured for direct installation within a spindle without the use of a drill chuck, a sleeve, or a collet. For example, the shaft 42, or more specifically, the first section 46 of the cutting apparatus 40 may be tapered and sized for insertion into a sleeve prior to installation into a spindle or for direct installation into the spindle.

Figure 10:
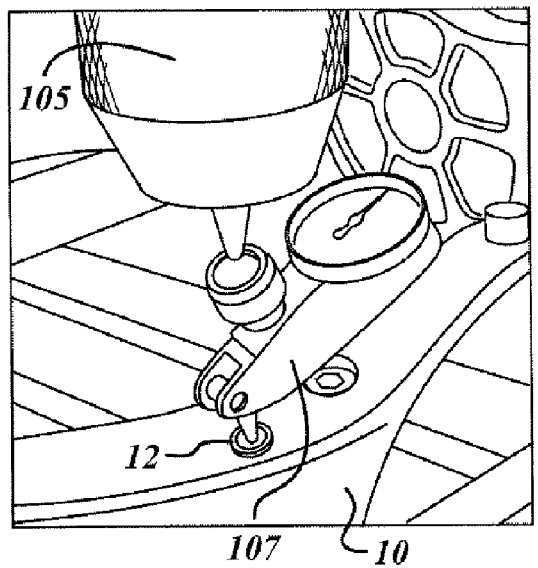
FIG. 10 is a perspective view of a test indicator residing between the milling machine and the gyro gimbal of FIG. 9 and used in accordance with an embodiment of the present invention.

In step 106, a structure, such as the gyro gimbal 10, is mounted on the milling machine table such that the damaged rivnut of concern to be replaced is accessible. In step 108, the center of the rivnut is determined. A center test indicator, such as the test indicator 107 shown in FIG. 10, may be used to determine the rivnut center.

In step 110, the X and Y axes are zeroed on the milling machine. In step 112, a mark is placed on the head of the rivnut as a visual aid to indicate if and when the rivnut is rotated. In step 114, a vacuum device having a vacuum nozzle, hose, or the like, such as the vacuum hose 115 shown in FIG. 11, may be positioned near the rivnut or point of operation. Suction through the hose is activated. The vacuum may remain "ON" during any cutting and reaming operations depending upon the application and materials of related components. Use of the vacuum can be especially desirable when cutting or reaming is performed on a rivnut that is mounted on a gimbal formed of a material containing beryllium or the like.

The following steps 116-120 may be referred to as the riveted fastener preparation phase. In step 116, the rivnut is reamed. A reamer, such as the reamer 117 shown in FIG. 11, is installed in the drill chuck and used to ream the inner channel of the rivnut, such as the inner channel 24. The set spindle speed for the reaming procedure may vary depending upon the size of the reamer, the size of the rivnut inner channel, and the materials of the rivnut and reamer. As an example, when a number 24 reamer having a 0.152 inch diameter reamer is used the spindle speed may be set at approximately 1000 RPM.

In step 118, the reamed inner channel is tapped. The rivnut may be tapped by hand or manually to thread the reamed inner channel of the rivnut. Threading of the reamed inner channel aids further in the removal of the rivnut head from the gyro gimbal. In step 120, the rivnut is again reamed using the same reamer as used in step 116 to remove any burrs that may exist due to the tapping process of step 118.

The following steps 122-134 may be referred to as the cutting preparation phase. In step 122, a riveted fastener extraction cutting apparatus, such as the cutting apparatus 40, is installed into the drill chuck. In step 124, a first verification is performed to assure that the pivot plate, such as the pivot plate 44, rotates freely on the cutting apparatus. In step 126, the pivot plate is rotated and held at a perpendicular or 90° position relative to the centerline of the shaft.

In step 128, with the spindle not rotating, the quill and thus the spindle of the milling machine are lowered such that the pivot plate touches the top surface of the rivnut head. In step 130, the readout of step 102 is zeroed.

In step 132, the quill is raised such that the cutting apparatus is above the rivnut head. At this stage, the pivot plate should rotate freely and at rest be in a vertical orientation parallel with the shaft. One of the cutting element, such as one of the cutting elements 62, is in the slot of the second section, such as the slot 52 of the second section 50.

In step 134, a second verification is performed to assure that the pivot plate rotates freely. The spindle is spun while the cutting apparatus is above and not contacting the rivnut. The spindle may be spun, as an example, at a speed of approximately 1800 RPM. When it is clear that the pivot plate is able to rotate freely the spindle is stopped.

The following steps 136-142 may be referred to as the cutting phase. In step 136, the cutting apparatus is inserted into the rivnut such that the pivot plate protrudes through the inner channel. The cutting apparatus may be inserted up to when the shoulder of the cutting apparatus, such as the shoulder 48 is approximately 0.05 inches from the rivnut head.

In step 138, the milling machine is activated and the spindle is rotated. The spindle may be spun at approximately 1800 RPM. Of course, the speed of the spindle is varied per application.

In step 140, the quill is raised in an upward motion to gently cut out the protruding portion of the rivnut up to a predetermined dimension away from the inner surface of the blind cavity of the gyro gimbal. For example, the protruding portion 32 may be cut until one of the cutting edges 64 or the upper cutting edge thereof is the predetermined distance from the inner surface 76. The quill may be raised to a predetermined setting $P_s$, which is equal to the sum of the height of the rivnut head $H_1$, the cross-sectional thickness of the gimbal T, the predetermined distance $P_d$, and the height of the cutting element $H_2$. This can be measured using the readout. The stated dimensions can be best seen in FIG. 5. The predetermined distance $P_d$ refers to the remaining portion of the rivnut that protrudes within the gimbal upon completion of the cutting process. Depending upon the application the cutting apparatus may start cutting the uncut protruding portion when it is approximately at a readout position of 0.59 inches. As an example, the quill maybe raised from the initial cutting position of 0.59 inches to a predetermined setting $P_s$ of 0.275 inches.

In step 142, the cutting apparatus is lowered such that the shoulder is within approximately 0.05 inches of the rivnut head and the spindle is stopped from spinning.

The following steps 144-150 may be referred to as the cutting apparatus removal phase. In step 144, the cutting apparatus is released from the spindle. In step 146, the quill and spindle are raised leaving the cutting apparatus extending through the rivnut and the pivot plate in the blind cavity. In step 148, the top surface, such as the top surface 43, of the cutting apparatus shaft is lightly striked in a vertical or downward direction to assure that the pivot plate is in a vertical position. The shaft is held and may be striked, for example, with a handle of a screwdriver or the like. In step 150, the cutting apparatus is removed from the rivnut.

The following steps 152-168 may be referred to as the cut verification phase. In the cut verification phase the protruding depth of the riveted fastener or rivnut is measured to assure that it is approximately within a desired or predetermined depth range. An example depth range is approximately between 0.005-0.01 inches.

Figure 12:
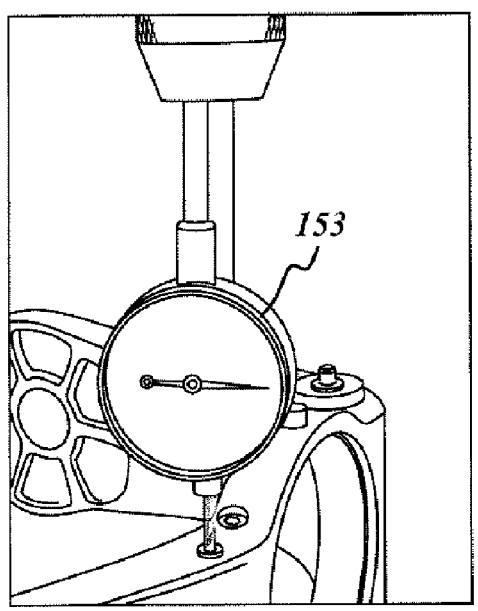
FIG. 12 is a perspective view of a travel indicator and the blind riveted fastener depth indicator residing between the milling machine and a riveted fastener and used in accordance with an embodiment of the present invention.

In step 152, a displacement indicator is installed in the chuck. The displacement indicator may be in the form of a dial indicator. A sample displacement indicator 153 is shown in FIG. 12. In step 154, a blind riveted fastener depth indicator, such as the depth indicator 88, is installed in the displacement indicator. Of course, steps 152 and 154 may be reversed.

In step 156, the depth indicator is lowered into and through the rivnut. In step 158, the spindle is moved laterally such that the chamfered tip, such as the chamfered tip 96, of the depth indicator is directly below the inner surface of the gyro gimbal. In step 160, the depth indicator is raised until the chamfered tip touches the inner surface. In step 162, the displacement indicator is zeroed.

In step 164, the depth indicator is lowered and laterally translated such that the shaft, of the depth indicator is approximately in the center of the rivnut. In step 166, the depth indicator is raised until the chamfered tip touches the cut surface of the remaining protruding portion of the rivnut, such as the cut surface 75 of the remaining portion 74.

In step 168, a measurement is taken on the displacement indicator to determine depth of the remaining protruding portion. When the determined depth is within the predetermined range step 170 is performed. When the determined depth is larger than the depths associated with the predetermined range then steps 122-166 are repeated to further cut the riveted fastener such that the depth of the protruding portion is within the predetermined range.

The following steps 170-176 may be referred to as the clean-up phase. In step 170, a riveted fastener head extraction apparatus, such as the extraction apparatus 78, is used to remove the head and the remaining portions of the rivnut. The shaft of the extraction apparatus is screwed into the tapped threads of the head formed in step 118. As the shaft is screwed into the head the rivnut is pulled out of and separated from the structure. The rivnut may need to be held from rotating during removal, thus a pair of pliers may be used to hold the head and prevent it from rotating within the structure. This is illustrated in FIG. 13, wherein a pair of pliers 171 are used to hold the rivnut head.

In step 172, a vacuum having a nozzle, hose, or the like, such as the hose 173 that is shown in FIG. 14, is used to remove shavings and debris from the interior of the blind cavity. Tweezers may be used as appropriate to assist in the removal of the debris. Nearby or other blind cavity holes, other than that in which the rivnut was removed from, may need to be plugged to provide adequate negative pressure to remove the debris. Tubing may be attached to the vacuum and inserted into the blind cavity to further assist in the removal of debris. Small diameter nylon tubing may be used. In step 174, the gyro gimbal may be removed from the table and shaken to loosen any remaining debris. Step 172 may be repeated following step 174.

In step 176, a visual debris indication device may be used to verify that the blind cavity is free of debris. A sample visual debris indication device 177 is shown in FIG. 15 having a fiber optic cable 179 and a light source 181. The visual debris indication device may be in the form of a fiber optic light to allow one to inspect the interior of the blind cavity, as shown. The visual debris installation device may also be in the form of a fiber optic camera or may be in some other form known in the art.

The following steps 178-188 may be referred to as the replacement phase. In step 178, a replacement rivnut is installed. The replacement rivnut is threaded onto a rivnut installation tool and is installed using techniques known in the art. In step 180, the head of the replacement rivnut is marked to allow for visual indication of rivnut rotation during the following torque test of step 184. In step 182, a fastener, having a washer, is screwed into the replacement rivnut.

In step 184, it is determined whether the rivnut is installed properly such that it does not rotate under an applied torque. A torque wrench may be used to apply rotational force on the fastener of step 182. A torque pressure is applied within a given range. For example, a torque pressure of approximately between 12-15 in-lbs may be applied. When the rivnut does rotate step 186 is performed, otherwise step 188 is performed.

In step 186, the installation tool may be reused to further compress the replacement rivnut or the replacement rivnut may be removed as described above and another rivnut may be installed. In step 188, the fastener and the washer are removed from the replacement rivnut and the marking applied in step 180 may be removed.

The above-described steps are meant to be illustrative examples; the steps may be performed sequentially, synchronously, simultaneously, or in a different order depending upon the application.

The present invention provides a method for the replacement of riveted fasteners, that is especially applicable to riveted fastener applications where only one side of the riveted fastener is accessible due to the presence of a blind cavity or the like. The present invention also provides sample extraction apparatuses and a sample depth indicator that may be used in the stated method. The present invention allows for the replacement of riveted fasteners via a single access side without cutting or damaging associated structures in which the riveted fasteners are installed.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An extraction apparatus for the removal of a riveted fastener residing within a blind cavity of a structure comprising:
    a shaft having a first section configured for attachment to a high-speed rotating device and
    a second section configured for insertion into an inner channel of a riveted fastener crimped intimately around the periphery of a designated blind cavity and wherein said first section comprises a first outer diameter that is larger than a second outer diameter of said second section; and
    a pivot plate including at least one cutting element mechanically coupled to said shaft and configured to cut a portion of the riveted fastener within said blind cavity, said cutting element having a pair of cutting edges and a pendulous weight, wherein said pendulous weight is configured to orient said cutting element within a slot parallel with the shaft for insertion of the device within said blind cavity of a structure;
    said shaft, pivot plate and said cutting element configured such that verification is carrier out to assure that said pivot plate rotates freely on the extraction apparatus such that said cutting element can pivot outwardly to a cutting orientation perpendicular to the center axis of rotation of the shaft away from a centerline of said shaft due to centrifugal forces exerted thereon.

2. An apparatus as in claim 1 wherein said shaft comprises a slot for at least partial insertion of said cutting element.

3. An apparatus as in claim 1 further comprising a pivot pin coupling said cutting element to said shaft.

4. An apparatus as in claim 1 wherein said shaft is formed of a nonmagnetic material.

5. An apparatus as in claim 1 wherein said shaft is formed of a material selected from at least one of stainless steel, titanium, and plastic.

6. An apparatus as in claim 1 wherein said cutting element is formed of at least one material selected from high-speed steel and carbide.

7. An extraction apparatus for the removal of a riveted fastener from a blind cavity of a structure comprising:
    a shaft configured for attachment to a high-speed rotating device;
    a cutting element mechanically coupled to said shaft configured to pivot outwardly to a cutting orientation perpendicular to the center axis of rotation of the shaft due to centrifugal forces exerted thereon by a high-speed rotating device and configured to cut a portion of the riveted fastener,
wherein said shaft and said cutting element are configured for insertion through an inner channel of the riveted fastener; and
    a pendulous weight coupled to said cutting element wherein said pendulous weight orients said cutting element within a slot parallel with the shaft for insertion of the device within a blind cavity of a structure due to gravitational forces exerted thereon when the shaft is not rotating and pivots said cutting element to a cutting orientation perpendicular to an center axis of rotation of the shaft away from a centerline of said shaft due to centrifugal forces exerted thereon and wherein said shaft and cutting element are configured such that verification is carried out to assure that said cutting element rotates freely on the extraction apparatus.

8. An extraction apparatus for the removal of a riveted fastener from a blind cavity of a structure comprising:
- a shaft configured for attachment to a high-speed rotating device;
- a cutting element mechanically coupled to said shaft and configured to cut a portion of the riveted fastener wherein said shaft and said cutting element are configured for insertion through an inner channel of the riveted fastener; and
  - a pivot plate coupled to said shaft and comprising said cutting element configured to pivot outwardly to a cutting orientation perpendicular to the center axis of rotation of the shaft due to centrifugal forces exerted thereon by a high-speed rotating device and wherein said pivot plate further comprises a pendulous weight that pivots said cutting element within a slot parallel to said shaft due to gravitational forces exerted thereon when the shaft is not rotating and wherein said pivot plate and cutting element are configured such that verification is carried out to assure that said cutting element rotates freely on the extraction apparatus.

* * * * *